(12) United States Patent
Latter et al.

(10) Patent No.: US 6,341,161 B1
(45) Date of Patent: Jan. 22, 2002

(54) METHOD AND SYSTEM FOR PROVIDING ENHANCED CALLER IDENTIFICATION INFORMATION INCLUDING TAILORED ANNOUNCEMENTS

(76) Inventors: Teresa Farias Latter, 21190 Valley Dr., Kildeer; John Wesley Moss, 505 Red Bridge Rd., Lake Zurich, both of IL (US) 60047; Thomas Joseph McBlain, 1954 N. Charter Point Dr., Arlington Heights, IL (US) 60004-7239

( * ) Notice: Subject to any disclaimer, the term of this patent is extended or adjusted under 35 U.S.C. 154(b) by 0 days.

(21) Appl. No.: 09/366,393

(22) Filed: Aug. 3, 1999

Related U.S. Application Data

(63) Continuation-in-part of application No. 09/253,339, filed on Feb. 19, 1999, now Pat. No. 6,160,876, which is a continuation-in-part of application No. 09/122,484, filed on Jul. 24, 1998.

(51) Int. Cl.[7] .......................... H04M 1/56; H04M 15/06
(52) U.S. Cl. ........................... 379/142.01; 379/142.04; 379/142.06; 379/142.17; 455/415
(58) Field of Search ........................... 379/88.01–88.02, 379/88.19–88.21, 93.23, 720, 127, 142, 354, 210–212, 215, 201, 67.1, 68, 127.06, 142.01, 142.04, 142.06, 142.09, 142.17; 455/415, 566

(56) References Cited

U.S. PATENT DOCUMENTS

| | | |
|---|---|---|
| 4,866,755 A | 9/1989 | Hashimoto |
| 4,922,490 A | 5/1990 | Blakley |
| 4,958,366 A | 9/1990 | Hashimoto |
| 5,333,180 A | 7/1994 | Brown et al. |
| 5,388,146 A | 2/1995 | Morduch et al. |
| 5,412,712 A | 5/1995 | Jennings |
| 5,440,615 A | 8/1995 | Caccuro et al. |
| 5,511,111 A | 4/1996 | Serbetcioglu et al. |
| 5,581,604 A | 12/1996 | Robinson et al. |
| 5,651,053 A | 7/1997 | Mitchell |
| 5,729,592 A | 3/1998 | Frech et al. |
| 5,850,435 A | 12/1998 | DeVillier |
| 5,875,422 A * | 2/1999 | Eslambolchi et al. .......... 704/3 |
| 5,905,774 A * | 5/1999 | Tatchell et al. .......... 379/88.04 |

\* cited by examiner

*Primary Examiner*—Duc Nguyen
(74) *Attorney, Agent, or Firm*—Brinks Hofer Gilson & Lione

(57) ABSTRACT

A system (100) and method deliver audible caller identification information when standard Caller ID information can not be provided. A calling party is prompted by an announcement to provide the audible caller identification information. The announcement may be tailored by changing the language of the announcement, for example, to conform to the majority of calls received by the called party. A special designator may be stored in association with account information when the service is ordered. The designator is read before the announcement is played to the calling party. The audible caller identification information is recorded and played to the called party in a message. The message may be tailored by changing the language or format of the announcement.

8 Claims, 1 Drawing Sheet

METHOD AND SYSTEM FOR PROVIDING ENHANCED CALLER IDENTIFICATION INFORMATION INCLUDING TAILORED ANNOUNCEMENTS

RELATED APPLICATIONS

This application is a continuation-in-part of application Ser. No. 09/253,339, filed Feb. 19, 1999, now U.S. Pat. No. 6,160,876 which is a continuation-in-part of application Ser. No. 09/122,484, filed Jul. 24, 1998.

BACKGROUND OF THE INVENTION

The present invention relates generally to telecommunications services and more particularly to caller identification.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One such occurrence is the inability of a service provider to provide the standard Caller ID information for a particular incoming call. A service provider may not be able to provide the standard Caller ID information if the Caller ID information is blocked by the calling party, or if the Caller ID information is unavailable or incomplete. This may occur, for example, if the calling party pressed *67 when initiating the call When the standard Caller ID information cannot be provided, the called party is not adequately informed about who is calling and cannot determine whether or not to accept the incoming call before answering the call. Because the effectiveness of Caller ID systems is greatly reduced when information cannot be provided, an improved system and method for providing caller identification information that overcome these deficiencies are needed.

Patent application Ser. No. 09/122,484, filed Jul. 24, 1998 and commonly assigned to the assignee of the present application, is incorporated herein by reference. This patent application discloses a method and system for providing a called party with audible caller identification information when standard caller identification cannot be provided. When standard caller identification cannot be provided, the call is blocked and a request for audible caller identification is transmitted to the calling party. The audible information is subsequently transmitted to the called party.

Patent application Ser. No. 09/253,339, filed Feb. 19, 1999, is also incorporated herein by reference. This application discloses a method for providing enhanced caller identification information when per line blocking of Caller ID is present. When per line blocking is activated for a subscriber line, the Caller ID information for that line is never transmitted by the system.

In the systems disclosed in the incorporated patents, a standard message is played to the calling party when standard caller identification cannot be provided. The standard message includes a request for audible caller identification. Similarly, a standard notification is played to the called party when the audible caller identification is conveyed to the called party. However, such a standard message and standard notification may not be suitable for all applications and all customers. For example, a customer may receive a majority of calls from calling parties who primarily speak a language other than English, so a standard message in the English language will not be as effective as required.

Accordingly, there is a need for a system and method which permit tailored announcements to be made to the calling party requesting audible caller identification information for presentation to the called party, and for tailored notifications to be made to the called party.

DETAILED DESCRIPTION PRESENTLY PREFERRED EMBODIMENTS

By way of introduction, the preferred embodiments below include a method and system for providing a called party with audible caller identification information when standard caller identification information cannot be provided. In one embodiment, calls for which standard caller identification information is blocked, unavailable or incomplete are prevented from being connected to the called party. A forward call message is transmitted with the directory number of the called party contained in a normally unused data field. A presentation indicator for the directory number is set in the forward call message to presentation allowed so that blocking of the called party's identification information does not occur. The system determines if the called party has selected a request message defining the nature of the request to tailor the request message to the called party's requirements. The forward call message includes a parameter specifying the use of the customer selected request message.

In response to the forward call message, a request for audible caller identification information is transmitted to the calling party. The request is tailored to the called party's requirements, and may be in a specified language or be textual rather than audible, or may be appropriate for a business customer of the called party. If the calling party provides the requested audible caller identification information, the audible information is transmitted to the called party. The notification including the audible information may also be tailored to the requirements of the called party, for example by playing the message in a specified language or format Caller identification information can thus be provided to the called party when standard caller identification information cannot be provided.

Figure 1:
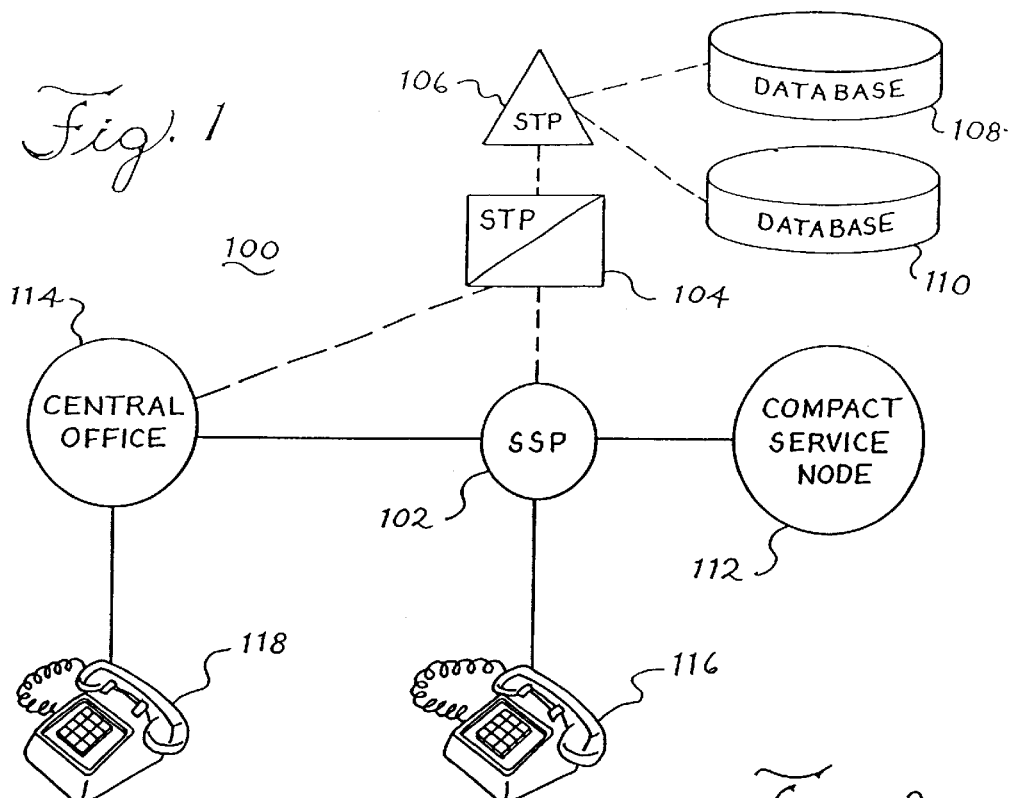
FIG. 1 is a block diagram of a telecommunications system.

Referring now to the drawing, FIG. 1 is a block diagram of a telecommunications system 100. The system 100 comprises a service switching point (SSP) 102, a signal transfer point (STP) 104, a service control point (SCP) 106, a first SCP database 108, a second SCP database 110, a compact service node (CSN) 112, a central office 114, called telephone station 116 and calling telephone station 118. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 102 preferably comprises an AIN switch that routes calls, recognizes and responds to triggers, generates queries to obtain call information and responds to returned call information. SSP 102 connects called telephone station 116 with central office 114 to enable calls to be placed between called telephone station 116 and calling telephone station 118. SSP 102 preferably communicates with SCP 106, central office 114 and CSN 112 by utilizing a signaling protocol such as Signaling System 7 (SS7) or other such signaling protocols as presently known to those skilled in the art or developed in the future. SSP 102 preferably generates queries to SCP 106 and receives and responds to responses to the queries returned from SCP 106. In the illustrated embodiment, communication between the SSP 102 and the SCP 106 employs Transaction Capabilities Applications Protocol or TCAP.

STP 104 preferably comprises a network element that transfers signaling communications in response to signaling protocols such as SS7 or other such signaling protocols as presently known to those skilled in the art or developed in the future. STP 104 preferably transfers queries from SSP 102 to SCP 106 and transfers responses to the queries from SCP 106 to SSP 102.

SCP 106 preferably comprises an AIN element that stores account information, call information and receives and responds to queries. SCP 106 preferably stores account information about a called party's account as well as call control information in the first SCP database 108 and can access the stored information. SCP 106 also stores standard caller identification information in the second SCP database 110 and can access the stored caller identification information. SCP 106 receives queries generated by SSP 102 and preferably responds to the queries by performing database searches to locate the requested call control or account information or caller identification information as known to those skilled in the art. SCP 106 can forward the call control or account information or caller identification information to SSP 102.

CSN 112 preferably comprises a network element that enables communications between telephone stations 116, 118 and the network. CSN 112 can preferably transmit messages to and receive responses from telephone stations 116, 118. CSN 112 can generate announcements that can be transmitted to telephone stations 116, 118. CSN 112 can transmit responses such as audible caller identification information from telephone station 118 to telephone station 116 by connecting telephone stations 118, 116 or by recording and playing back the responses as known to those skilled in the art. The announcements transmitted to telephone station 116 preferably comprise accept and reject options along with requests for input from the telephone station 116. The requests for input preferably comprise requests for input that can be used by CSN 112 to cancel calls to telephone station 116, connect calls to telephone station 116, forward calls to a voice mail system or another location such as another telephone line, and transmit messages to telephone station 118. As used herein, the term voice mail system means all types of message recording systems as known to those skilled in the art. CSN 112 can preferably receive and respond to the input transmitted from telephone station 116. The term input means any suitable signal such as DTMF tones, voice input, dial pulse input or modem/fax input as known to those skilled in the art.

In alternative embodiments, other system equipment may provide the functions provided by CSN 112. For example, equivalent functionality may be provided by an AIN service node or by an Intelligent Peripheral, as those terms are understood in the art. These components and others which are operationally equivalent may be substituted for the CSN 112 in FIG. 1.

Database 108 preferably comprises a data storage element for use with SCP 106 as known to those skilled in the art. Database 108 preferably stores account and call control information that can be implemented by SSP 102 to control calls. Such account and call control information is known to those skilled in the art.

In accordance with the illustrated embodiment, the database 108 stores a special designator associated with the account which defines called party requirements for transmitting to a calling party a request for audible caller identification information. In the illustrated system, all prompts and announcements conveyed to the calling party and the called party are presented in accordance with a customer selected message request. The customer, the called party, may specify the nature of the prompts and announcements to be played to the calling party as well as the nature of the announcements and notifications to be played to the customer or called party. In one example, the customer may specify the language for the prompts and announcements, such as Spanish or Mandarin Chinese. In another example, the customer may specify that prompts and announcements be transmitted as text data, for example for use by telecommunication device for the deaf (TDD) equipment used by the calling party. In another example, the customer may specify that prompts and announcements be transmitted tailored to a customer of a called party which is a business, as distinct from prompts and announcements that might be made to a party calling the customer's residence. For example, when the called party is a business, the message might say "We appreciate your business. In order to permit us to better serve you, please state your name at the tone." In contrast, when the called party is a residence, the message may state "The party you called does not accept unidentified calls. Please state your name at the tone." Many other possibilities for tailoring the request sent to the calling party according to called party requirements may be implemented.

Further, the notification provided to the called party may be customized according to requirements of the called party, as well. If the called party does not primarily speak English, the language of the announcements and prompts played to the called party may be tailored accordingly. Further, a text-based announcement or any other option may be specified. The option selected may not match the option selected for announcements and prompts made to the calling party. For example, it may be expected that many calls, especially calls for which standard caller identification is unavailable, will be received from speakers of a first language, while the person primarily responsible for answering the phone at the called party may speak a second language. For maximum flexibility and user convenience, both calling party messages and called party messages may be independently tailored according to customer requirements.

In the illustrated embodiment, the customer selected request message is specified at the time the service is ordered. The customer may be given only one or a few choices for tailoring the announcement, such as a choice of English or Spanish announcements. Or the customer may be given many choices, such as those described above, for tailoring the announcements and prompts. However, in the preferred embodiment, once the customer has made a selection, that selection is retained and stored as a special designator at equipment such as SCP 106 throughout the system. Thereafter, whenever a call is processed for completion to the customer's called communication station, the special designator is read and the request message including prompts and announcements is made according to the designator.

Database 110 preferably comprises a standard caller identification with name database as known to those skilled in the art. When the information is available in the system, database 110 typically includes the name of the person associated with calling telephone station 118, along with the telephone number that is associated with calling telephone station 118. Database 110 can alternatively comprise a caller assistance database as known to those skilled in the art. While databases 108, 110 are depicted within a telecommunications system, databases 108, 110 can comprise any suitable databases containing information adapted for use in the present embodiment and are not limited to databases located within a telecommunications network. It is also important to note that while databases 108, 110 are shown as separate components, they can be implemented as a single database.

Central office 114 preferably comprises an AIN network switch as known to those skilled in the art. Central office 114 enables calls to be placed between calling telephone station 118 and called telephone station 116. Alternatively, central office 114 can comprise a non-AIN network switch as known to those skilled in the art.

Telephone stations 116, 118 preferably comprise analog telephone sets as known to those skilled in the art. Alternatively, telephone stations 116, 118 can comprise wireless, PCS, ISDN or any other form of communication station known to those skilled in the art. Called telephone station 116 preferably includes CPE equipment for use with caller identification services as known to those skilled in the art.

Figure 2:
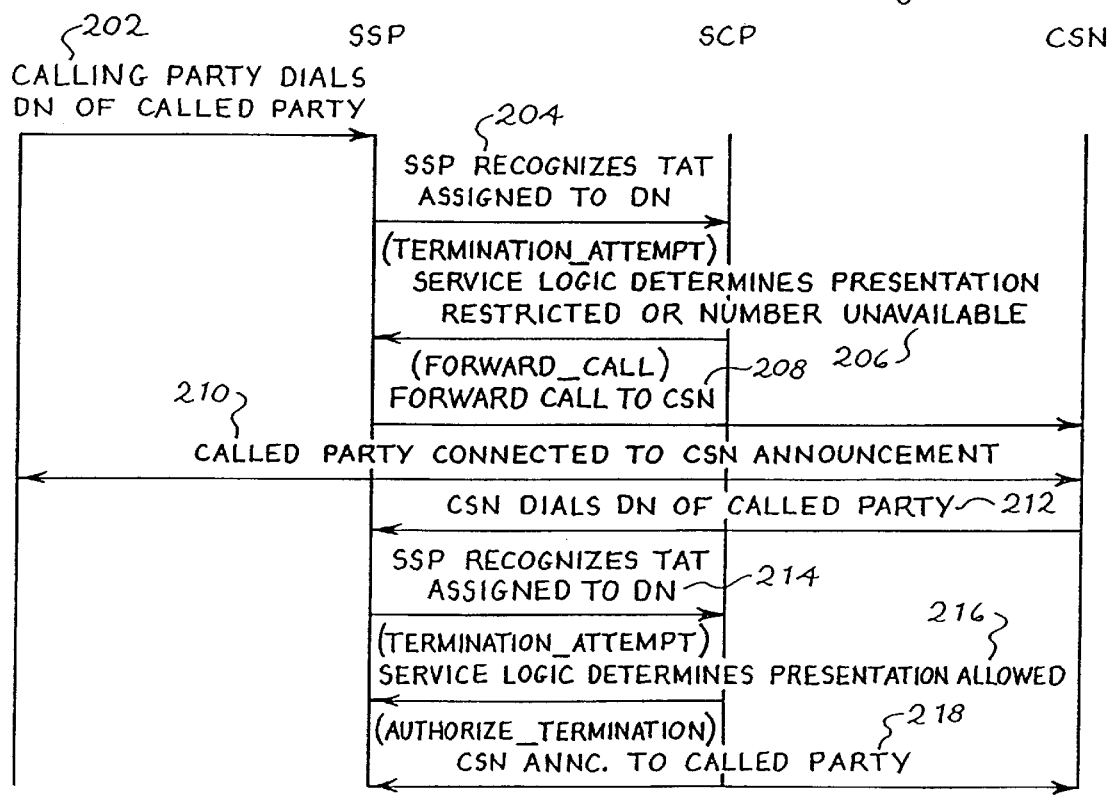
FIG. 2 is a call flow diagram illustrating a method for processing a call in the telecommunications system of FIG. 1.

FIG. 2 is a call flow diagram illustrating a method for processing a call in the telecommunication system 100 of FIG. 1. FIG. 2 illustrates communication between SSP 102, SCP 106 and CSN 112 for processing the call.

At step 202, the calling party at the calling telephone station 118 calls the directory number (DN) of the called communication station 116. The calling party may choose to enable Calling Number Delivery Blocking, for example, by dialing *67 before dialing the DN of the called communication station 116. This will block delivery of the standard caller ID information for the calling telephone station 118. In some systems, portions of the telecommunications system 100 such as the trunk group terminating the call may not pass the standard Caller ID information.

At step 204, the terminating SSP 102 recognizes that a terminating attempt trigger (TAT) is assigned to the called directory number. In response to the TAT, the SSP 102 creates a Termination_Atttempt query message and transmits the query message to the SCP 106 for analysis. In the illustrated embodiment using AIN elements, the query message is formatted according to AIN Release 0.1 TCAP. The query message includes several parameters as is known to those ordinarily skilled in the art. For the Termination_Atttempt query message, the following parameters are specified:

| | |
|---|---|
| UserID | DN to which the TAT is assigned (Called DN) |
| BearerCapability | 01 (3.1 KHz) |
| CalledPartyID | DN to which the TAT is assigned (Called DN) |
| Lata | Local Access and Transport Area of Called DN |
| TriggerCriteriaType | 15 (terminating attempt) |
| CalledPartyStationType | Originating Line Information of the Called DN |
| ChargeNumber | ANI of the originating facility or ANI of last forwarding station, if available |
| CallingPartyID | DN of the calling party (if available) |
| Presentation Restriction | 01 (Presentation Restricted) |
| | 10 (Number Unavailable) |
| ChargePartyStationType | Originating Line Information of the calling DN |
| OriginalCalledPartyID | First party that redirected the call |
| RedirectingPartyID | Last party that redirected the call |

If the calling party has blocked the standard Caller ID information, or if the system does not pass the standard Caller ID information for the calling communication station, the CallingPartyID parameter of the TAT query message will not be available. The Presentation Restriction Indicator parameter will be set to one of the binary values 01 or 10 to indicate this condition. This is in contrast to the situation in which the standard Caller ID information is available and the Presentation Restriction Indicator parameter is set to 00, to indicate presentation allowed.

In response to the Termination_Attempt query, the SCP 106 will validate the Presentation Restriction Indicator parameter of the CallingPartyID parameter. If the indicator is set to Presentation Restriction (01) or Number Unavailable (10), the SCP 106 will pass routing information to the SSP 102 in a Forward_Call response message, step 206. Further in response to the Termination_Attempt query, the SCP 106 will determine if the called party has set called party requirements for tailoring a request message to be sent to the calling party. In one embodiment, the SCP 106 will examine account information stored at the database 108. If the account information contains a special designator indicating that the called party has specified a customer selected request message should be used for the request message, the SCP 106 will pass call control information in the Forward_Call response message indicating this to the SSP 102.

In the illustrated embodiment using AIN elements, the response message is formatted according to AIN Release 0.1 TCAP. The response message includes several parameters as is known to those ordinarily skilled in the art.

In a first embodiment, for the Forward_Call query message, the following parameters are specified:

| | |
|---|---|
| CallingPartyID | DN to which the TAT is assigned (Called DN from the Termination_Attempt query with presentation allowed) |
| CalledPartyID | Lead DN from the ISDN trunk group connecting the CSN; customer-selected language or format option |
| PrimaryCarrier | 0110 (LEC) |
| AMAslpID | 008780000 (uniquely identifies a service and indicates flat rate) |

Thus, in this first embodiment, the SCP 106 detects the CalledPartyID parameter of the Termination_Attempt query received from the SSP 102. As noted above, this parameter is set to the DN of the called party, or the directory number of the called telephone station. The SCP 106 places this value in the Forward_Call response for the CallingPartyID parameter. The CallingPartyID parameter of the Forward_Call response has an associated Presentation Restriction Indicator parameter. The SCP 106 marks this Presentation Restriction Indicator as presentation allowed. The SCP 106 sets a parameter in the call forward message indicating that a customer selected request message may be used for the input. To indicate the customer-selected language or format option, an existing parameter of the Forward_Call query message is set to a predetermined value. For example, this information may be incorporated in spare bits such as the last five digits of the CalledPartyID. Any other suitable parameter may be used for passing this information.

In a second embodiment, a different parameter is used in the Forward_Call response message for communicating the called telephone station's DN. This parameter is the RedirectingPartyID. In this embodiment, the SCP 106 places the CalledPartyID DN from the Termination_Attempt query message into the RedirectingPartyID of the Forward_Call response message. The RedirectingPartyID has an associated Presentation Restriction Indicator parameter. The SCP 106 sets the associated Presentation Restriction Indicator parameter to presentation allowed. In this embodiment, the Forward_Call query message has parameters specified as follows:

| | |
|---|---|
| CallingPartyID | DN of the Calling Party (if available) |
| CalledPartyID | Lead DN from the ISDN trunk group connecting the CSN |
| PrimaryCarrier | 0110 (LEC) |
| RedirectingPartyID | DN to which the TAT is assigned (Called DN from the termination_attempt query) with presentation allowed (overwrites redirection information that the SSP would normally provide); customer-selected language or format option |
| AMAslpID | 008780000 (uniquely identifies a service and indicates flat rate) |

To indicate the customer-selected language or format option, an existing parameter of the Forward_Call query message is set to a predetermined value. For example, in this second embodiment, this information may be incorporated in spare bits such as the last five digits of the RedirectingPartyID. Any other suitable parameter may be used for passing this information.

In this embodiment, the system and method may be used when the called party subscribes to a per line blocking service.

At step 208, the SSP 102 receives the Forward_Call response message and originates a new call for the forwarded leg. The SSP 102 merges the new originating call and the existing terminating call. That is, the SSP 102 bridges or reconfigures the call. At this point, the SSP 102 routes the call as if it received an Analyze_Route message, using the CalledPartyID in the Forward_Call message to identify the new party. In the first embodiment described above, the CallingPartyID is the DN to which the termination attempt trigger is assigned. In the second embodiment, the redirecting number is the DN to which the termination attempt trigger is assigned. The SSP 102 forwards the call to the CSN 112.

At step 210, the forwarded call is answered by the CSN 112. The CSN 112 is operative to generate an announcement that is transmitted to the calling telephone station 118. In the illustrated embodiment, the announcement is a request which is tailored according to called party requirements. One example of a suitable announcement is "The party you are calling does not accept calls from unidentified numbers. At the tone, say your name or the company you represent and your call will be completed." This may be the default message. In another example, at the request of the customer or called party, announcements played to parties calling the called party may be played in another language such as Spanish or may be sent to the calling party as text data or TDD data. Further, if the called communication station is a business line, a message more suitable for a business customer of the called party may be played rather than the default message, which may be suitable for a residence telephone. In another example, announcements, prompts or notifications played to the called party may be tailored to vary from default message at the customer's request. Non-default messages are specified by the customer at the time the service is initiated. The nature of the message is set by the parameter received in the call forward message.

After transmission of the announcement to the calling party, the CSN 112 then detects a response. If the calling party provides a response, the response is recorded as audible caller identification information for subsequent playback to the called party. If no response is provided, the call is terminated.

At step 212, the CSN 112 originates a new call to the called telephone station 116. In the first embodiment described above, the CSN 112 originates the new call to the DN found in the CallingPartyID parameter of the Forward_Call response message. The parameter was set to the DN to which the TAT is assigned. In the second embodiment described above, the CSN 112 originates the new call using the DN found in the RedirectingPartyID parameter of the Forward_Call response message. The parameter was set to the DN to which the TAT is assigned.

At step 214, the SSP 102 recognizes that a terminating attempt trigger (TAT) is assigned to the called DN. Based on the TAT, the SSP 102 creates a termination_attempt query message and transmits the query message to the SCP 106 for analysis. The parameters required for the AIN release 0.1 TCAP query message in the illustrated embodiment are as follows:

| | |
|---|---|
| UserID | DN to which the TAT is assigned (Called DN) |
| BearerCapability | 01 (3.1 KHz) |
| CalledPartyID | DN to which the TAT is assigned (Called DN) |
| Lata | Local Access and Transport Area of the Called DN |
| TriggerCriteriaType | 15 (Termination Attempt) |
| CalledPartyStationType | Originating Line information of the called DN |
| ChargeNumber | ANI of the originating facility |
| CallingPartyID | DN of the calling party (CSN DN) |
| Presentation Restriction | 00 (Presentation Allowed) |
| ChargePartyStationType | Originating Line information of the calling DN |

At step 216, the service logic of the SCP 106 will validate the Presentation Restriction Indicator of the CallingPartyID parameter of the query message. If the indicator is equal to Presentation Allowed, the SCP 106 will create an Authorize_Termination response message and send it to the SSP 102. The parameters required for the AIN release 0.1 TCAP response message in the illustrated embodiment are as follows:

| | |
|---|---|
| CallingPartyID | DN of the calling party (CSN DN) |
| ChargeNumber | ANI of the calling party |

| | |
|---|---|
| ChargePartyStationType | Originating Line information of the calling DN |
| DisplayText | CNAME information |

At step 218, when the called party answers the called telephone station 116, in the illustrated embodiment the CSN 112 first plays an identifying message and requests a keypress input. This ensures that a human is present to answer the called telephone station 116 and distinguishes the case where a modem, fax or other equipment answers the called telephone station 116. The identifying message may be in a language or format specified by the customer or called party at the time the service is ordered. If the called party accepts the call, the CSN 112 connects the original calling party at the calling telephone station 118 to the called party at the called telephone station 116.

As can be seen from the foregoing, the present embodiments provide a system and method for delivering audible caller identification information when standard Caller ID information can not be provided and with a message tailored to called party requirements. The SCP detects the directory number to which a terminating attempt trigger is assigned and places this directory number in a parameter for transmission to the SSP using a forward_call message. The SCP determines the nature of the message that should be sent to the calling party to prompt the calling party to provide audible caller identification information. The message may be sent in a particular language or according to any other suitable requirements specified by the called party. When the called party is advised of the incoming call, the message may further be tailored in accordance with the customer's requirements. This message may be playing in a specified language or format, which may vary from the language or format of the message played to the calling party.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

We claim:

1. A method for processing a call from a calling party at a calling communication station to a called party at a called communication station, the method comprising:

(a) determining whether standard caller identification information for the calling communication station can be provided to the called communication station;

(b) transmitting a request for audible caller identification information to the calling communication station when the standard caller identification information cannot be provided to the called communication station, the request being tailored according to called party requirements including transmitting a forward call message which includes an identifier for the called communication station and a presentation indicator, including (b1) receiving a terminating attempt trigger message requesting completion of the call from the calling communication station to the called communication station;

(b2) detecting in the terminating attempt trigger messaged a Called Party Identifier, the Called Party Identifier corresponding to the called communication station;

(b3) placing the Called Party Identifier in the call forward message as a Redirecting Party Identifier;

(b4) marking the presentation indicator associated with the Redirecting Party Identifier as presentation allowed; and (b5) setting a parameter in the call forward message indicating that a customer selected request message should be used for the request; and (c) transmitting the audible caller identification information to the called communication station.

2. A method for processing a call from a calling party at a calling communication station to a called party at a called communication station in a telecommunications network including at least one service switching point (SSP) and a service control point (SCP), the method comprising:

(a) at an SSP, receiving the call from the calling communication station;

(b) transmitting a termination attempt query from the SSP to the SCP;

(c) at the SCP, in response to the termination attempt query, determining whether standard caller identification information for the calling communication station can be provided to the called communication station;

(d) at the SCP, determining if the called party has set called party requirements for tailoring the request message;

(e) transmitting a forward call message from the SCP to the SSP in response to a determination that standard caller identification information can not be provided, the forward call message including a n identifier for the called communication station; a presentation indicator for the called communication station, the presentation indicator being set to presentation allowed, and a parameter indicating that a customer selected request message should be used for the request;

(f) in response to t he forward call message, at the SSP, originating a call connecting the calling communication station and network equipment;

(g) from the network equipment, transmitting a request for audible caller identification information to the calling communication station in accordance with the customer selected request message; and (h) transmitting the audible caller identification information to the called communication station in a format specified by the called party.

3. The method of claim 2 wherein act (d) comprises identifying a language for transmitting the request.

4. The method of claim 3 wherein act (d) further comprises identifying a language for transmitting an announcement including the audible caller information to the called party.

5. A system for processing a call from a calling party at a calling communication station to a called party at a called communication station, the system comprising:

a service control point (SCP) operative to determine whether standard caller identification information for the calling communication station can be provided to the called communication station and whether the called party has indicated a customer selected message should be played to the calling party, and to transmit a forward call message which includes an identifier for the called communication station, a presentation indicator and a parameter indicating the customer selected request message;

a service switching point (SSP) coupled with the SCP to receive the forward call message and to initiate a new call; and a service node coupled with the SSP to complete the new call to the calling communication station to transmit a standard request for audible caller identification information to the calling communication station, the standard request using the customer selected request message.

6. The system of claim 5 wherein the service node is configured to transmit the standard request as an audible request in a language specified by the called party.

7. The system of claim 6 wherein the service node is further configured to transmit in a language specified by the called party an announcement including the audible caller identification information to the called communication station.

8. The system of claim 5 wherein the service node is configured to transmit the standard request as a text request.

* * * * *